US012794174B2

(12) United States Patent
Mauney et al.

(10) Patent No.: US 12,794,174 B2
(45) Date of Patent: Nov. 10, 2026

(54) ELECTRICAL PLUG CONNECTOR ASSEMBLY

(71) Applicant: KOSTAL Kontakt Systeme GmbH & Co. KG, Luedenscheid (DE)

(72) Inventors: Joseph Mauney, South Lyon, MI (US); Anatolli Babak, Kharkov (UA); Feras Al-Hourani, Royal Oak, MI (US); Maksim Lisovenko, Kyiv (UA)

(73) Assignee: KOSTAL Kontakt Systeme Gmbh & Co. KG, Luedenscheid (DE)

( * ) Notice: Subject to any disclaimer, the term of this patent is extended or adjusted under 35 U.S.C. 154(b) by 348 days.

(21) Appl. No.: 18/642,265

(22) Filed: Apr. 22, 2024

(65) Prior Publication Data

US 2024/0396262 A1 Nov. 28, 2024

(30) Foreign Application Priority Data

May 26, 2023 (DE) ..................... 10 2023 113 960.6

(51) Int. Cl.
*H01R 13/635* (2006.01)
*H01R 13/627* (2006.01)

(52) U.S. Cl.
CPC ....... *H01R 13/6273* (2013.01); *H01R 13/635* (2013.01)

(58) Field of Classification Search
USPC .......................................................... 439/346
See application file for complete search history.

(56) References Cited

U.S. PATENT DOCUMENTS

| | | | | |
|---|---|---|---|---|
| 4,152,041 A * | 5/1979 | Hollyday | H01R 13/7032 439/357 |
| 5,971,814 A * | 10/1999 | Boyd | H01R 33/09 439/356 |
| 6,340,310 B2 * | 1/2002 | Henrici | H01R 33/0836 439/360 |
| 7,241,189 B2 | 7/2007 | Mohs et al. | |

(Continued)

FOREIGN PATENT DOCUMENTS

| | | |
|---|---|---|
| CN | 212434943 U | 1/2021 |
| DE | 6813698 U | 9/1969 |

(Continued)

OTHER PUBLICATIONS

German Patent and Trademark Office, German Search Report for corresponding German patent application DE 10 2023 113 960.6 dated Jan. 5, 2024.

*Primary Examiner* — Tho D Ta
(74) *Attorney, Agent, or Firm* — Brooks Kushman P.C.

(57) ABSTRACT

An electrical plug connector assembly includes a first plug connector part having a plug contact and a second plug connector part that is attachable to the first plug connector part. The second connector part includes a complementary plug socket contact with a plug receptacle for receiving the plug contact of the first plug connector part. The plug contact at its oppositely situated narrow sides is provided in each case with indentations. Elastic locking hooks are mounted on the second plug connector part. When the plug connector parts are joined together, the elastic locking hooks engage with the indentations in the plug contact and counteract disconnection of the plug connector parts.

6 Claims, 3 Drawing Sheets

(56) References Cited

U.S. PATENT DOCUMENTS

| | | | | |
|---|---|---|---|---|
| 7,588,451 | B2 * | 9/2009 | Chen .................... | H01R 13/701<br>439/269.2 |
| 8,152,554 | B2 * | 4/2012 | Chapel ................. | H01R 13/652<br>439/346 |
| 2019/0148872 | A1 | 5/2019 | Lin et al. | |
| 2022/0368071 | A1 | 11/2022 | Carvalho et al. | |

FOREIGN PATENT DOCUMENTS

| | | | |
|---|---|---|---|
| DE | 4342363 | A1 | 6/1995 |
| DE | 102021112425 | A1 | 11/2022 |

* cited by examiner

ELECTRICAL PLUG CONNECTOR ASSEMBLY

CROSS-REFERENCE TO RELATED APPLICATIONS

This application claims priority to DE 10 2023 113 960.6, filed May 26, 2023, the disclosure of which is hereby incorporated in its entirety by reference herein.

TECHNICAL FIELD

The present invention relates to an electrical plug connector assembly having first and second plug connector parts that are attachable to one another, the first plug connector part including a plug contact, and the second plug connector part including a complementary plug socket contact having a plug receptacle for receiving the plug contact when the connector parts are attached to one another.

BACKGROUND

These types of plug connector assemblies are used, for example, for high-current applications in motor vehicles. Electrical plug connector assemblies for high-current applications have a larger design than those required for low-current or electronic applications.

EP 1 730 818 B1 (corresponds to U.S. Pat. No. 7,241,189) discloses an electrical plug connector assembly as described above. The plug socket contact for high-current applications disclosed therein includes a cage-like plug receptacle having a U-shaped cross section. A contact lamella insert is inserted into the plug receptacle and is conductively connected to the cage. The contact lamella insert likewise has a U-shaped design and includes two spaced-apart base bodies. Each base body includes multiple contact lamellae which with their contact areas protrude from the plane of the base body. The actual receptacle for receiving a plug contact, which has a complementary design with respect to the plug socket contact and is formed as a blade contact, is situated between the contact lamellae.

In the automotive industry there is increased interest in improved capability of electrical connectors in the event of a collision. Particularly, vehicle components via which power is transferred for safety and steering systems, for example, must be extremely reliable during a collision event.

SUMMARY

The present invention improves existing electrical plug connector assemblies in such a way that increased reliability is achieved, particularly with respect to very high acceleration forces that may possibly occur during an accident.

In the plug connector assembly according to the present invention, this is achieved in that the plug contact at its oppositely situated narrow sides is provided in each case with indentations, and that elastic locking hooks are mounted on the second plug connector part, and when the plug connector parts are joined together, the elastic locking hooks engage with the indentations in the plug contact and counteract disconnection of the plug connector parts.

While the connection of electrical plug connector parts typically takes place by locking together the housing parts, which are generally made of plastic, the additional securing of the connection according to the present invention by locking the metallic plug contact by means of likewise metallic, elastic locking hooks provides much greater security.

BRIEF DESCRIPTION OF THE DRAWINGS

The present invention is described below based on one exemplary embodiment, with reference to the appended Figures, which show the following.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of certain components. Therefore, specific structural and functional details disclosed herein are not to be interpreted as limiting, but merely as a representative basis for teaching one skilled in the art to variously employ the present invention.

Figure 1:
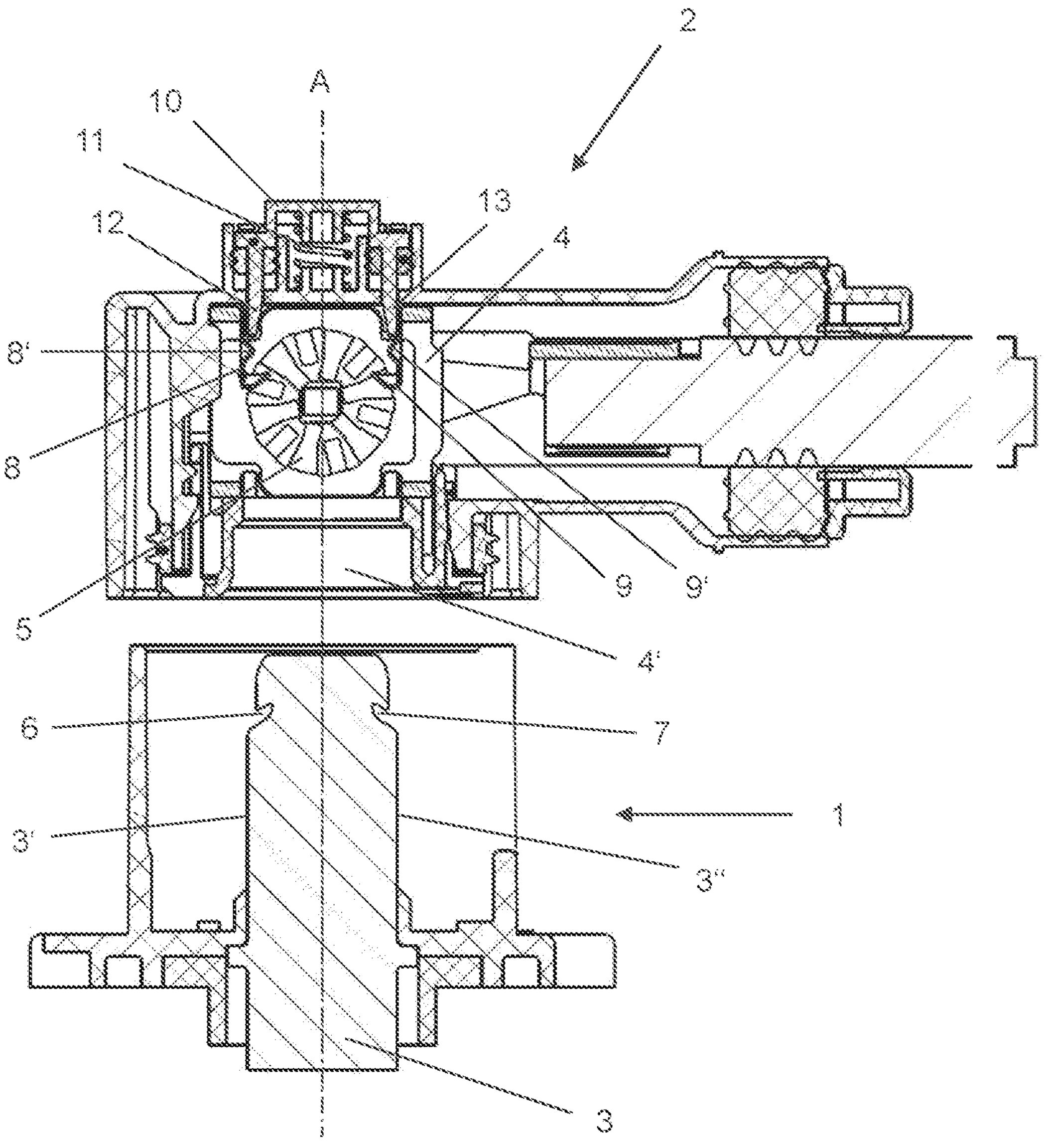
FIG. 1 illustrates a longitudinal section view of an electrical plug connector assembly according to an exemplary embodiment of the present invention in an unconnected state.
Figure 2:
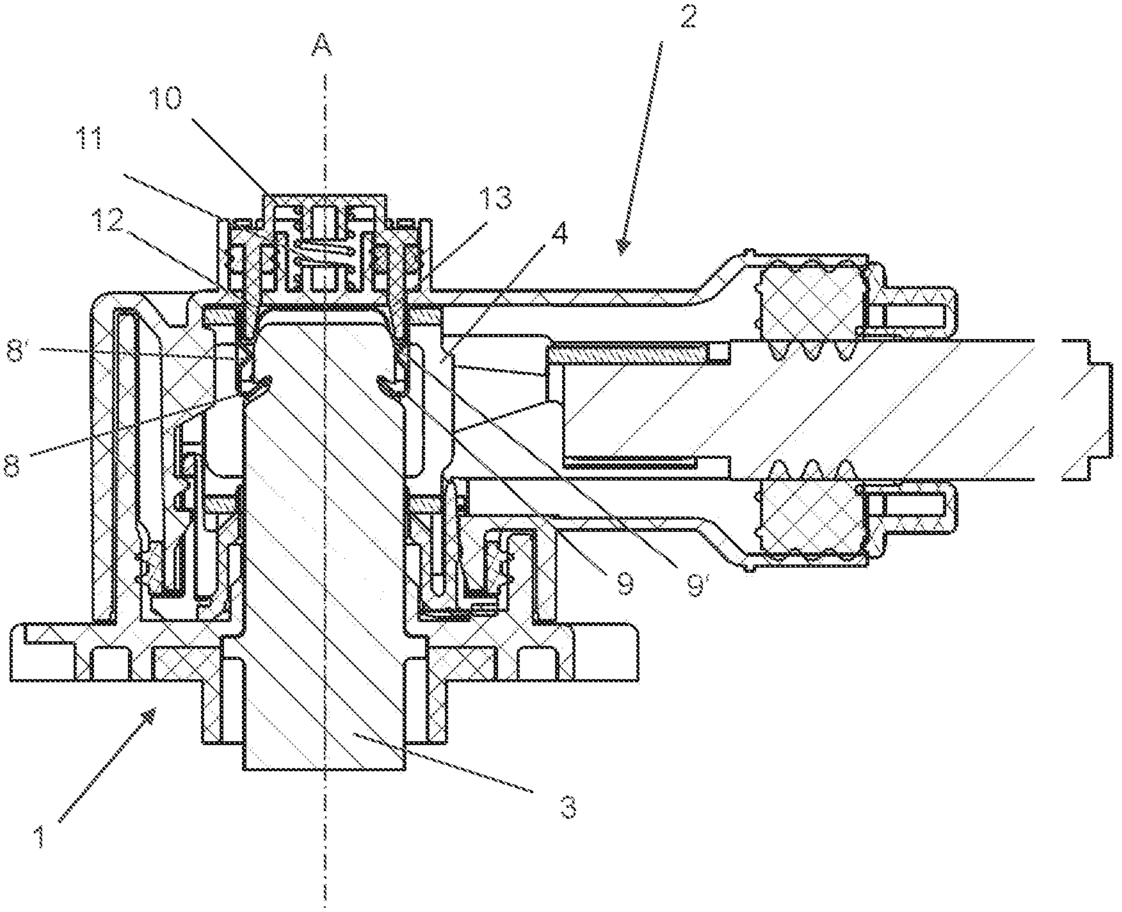
FIG. 2 illustrates a longitudinal section view of the plug connector assembly in a connected state.
Figure 3:
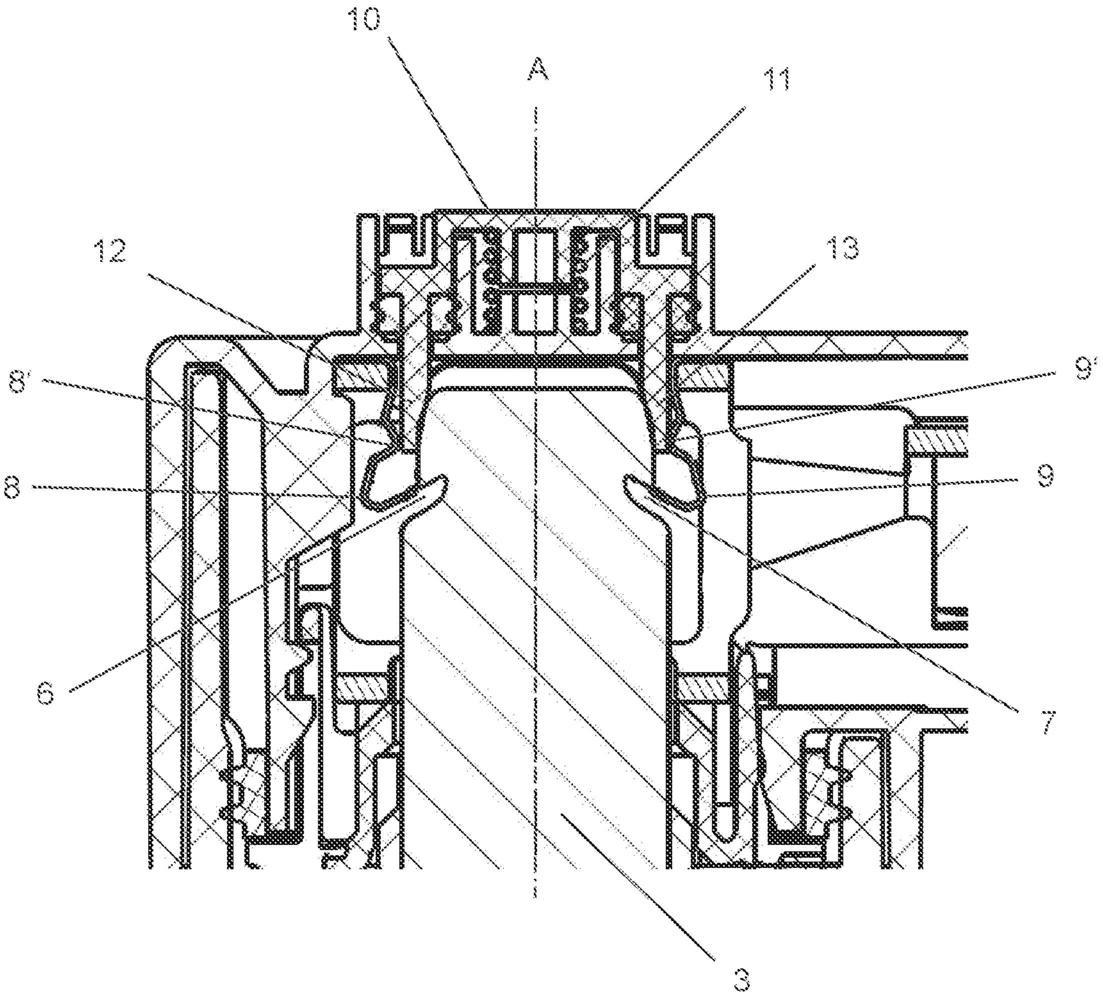
FIG. 3 illustrates a detailed view of the plug connector assembly in the connected state but unlocked for disconnection.

Referring now to FIGS. 1, 2, and 3, an electrical plug connector assembly in accordance with an exemplary embodiment of the present invention is shown. FIG. 1 illustrates a longitudinal section view of the plug connector assembly in an unconnected state; FIG. 2 illustrates a longitudinal section view of the plug connector assembly in a connected state; and FIG. 3 illustrates a detailed view of the plug connector assembly in the connected state but unlocked for disconnection.

As shown in FIGS. 1, 2, and 3, the plug connector assembly includes a first plug connector part 1 and a second plug connector part 2. Plug connector parts 1, 2 are attachable to one another. For instance, second plug connector part 2 may be joined to first plug connector part 1. First plug connector part 1 includes a plug contact 3. Second plug connector part 2 includes a complementary plug socket contact 4.

Plug socket contact 4 includes a plug receptacle 4' for receiving plug contact 3 when plug connector parts 1, 2 are attached to one another. This is discernible in FIG. 1, which shows the plug connector assembly in the unconnected state. Plug socket contact 4 has multiple contact lamellae 5, which with their contact areas protrude from the plane of the base body and are situated pointing radially inwardly. Contact lamellae 5 establish the electrical connection between plug socket contact 4 and plug contact 3 that is present in plug receptacle 4' thereof.

In addition, elastic locking hooks 8, 9 are mounted on plug socket contact 4 of second plug connector part 2. Elastic locking hooks 8, 9 are provided for counteracting disconnection of first and second plug connector parts 1, 2 when they are joined together. For this purpose, plug contact 3 of first plug connector part 1 at its oppositely situated narrow sides 3', 3 is provided in each case with indentations 6, 7. When plug connector parts 1, 2 are joined together, elastic locking hooks 8, 9 on plug socket contact 4 engage with indentations 6, 7 of plug contact 3 in each case. Locking hooks 8, 9 are designed as stamped/bent parts made of a spring sheet metal material, and have spring pre-tensioning that is directed inwardly, i.e., toward the center axis A of the plug connector assembly.

When plug connector parts 1, 2 are joined together, locking hooks 8, 9 on plug socket contact 4 of second connector part 2 give way upon contact with the end-face side of plug contact 3, initially springing outwardly and sliding along the narrow sides 3', 3" of plug contact 3 of first plug connector part 1, eventually hooking into indentations 6, 7 of plug contact 3 provided for this purpose. This is discernible in FIG. 2, which shows the plug connector assembly in the connected state. Locking hooks 8, 9 are hooked into indentations 6, 7 at the narrow sides 3', 3" of plug contact 3 and are held in this position by the spring pre-tensioning of the locking hooks. In this state, disconnecting plug connector parts 1, 2 from one another is possible only with significant effort and with destruction at least of locking hooks 8, 9, if not the entire plug connector assembly.

An unlocking means is mounted on second plug connector part 2 to allow non-destructive disconnection of plug connector parts 1, 2 from one another. This unlocking means includes a button 10 that is mounted on second plug connector part 2, on its side opposite from plug receptacle 4'. Button 10 is held in a rest position by the restoring force of a coil spring 11. Button 10 is provided with two extensions 12, 13 that extend in the insertion direction of the plug connector assembly (i.e., in the insertion direction of plug contact 3 into plug receptacle 4' of plug socket contact 4. Extensions 12, 13 of button 10 rest against the inner sides of locking hooks 8, 9, respectively.

To prepare for disconnection of plug connector parts 1, 2 from one another, button 10 is moved from its rest position into an actuating position, against the force of coil spring 11. As is most apparent in the detailed view in FIG. 3, extensions 12, 13 of button 10 slide between narrow sides 3', 3" of plug contact 3 and locking hooks 8, 9, which are bent inwardly at contact points 8', 9' against which extensions 12, 13 rest. Due to the engagement of extensions 12, 13 of button 10, locking hooks 8, 9 are lifted out of indentations 6, 7 at narrow sides 3', 3" of plug contact 3, and disconnection of plug connector parts 1, 2 from one another is made possible.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An electrical plug connector assembly comprising:

a first plug connector part including a plug contact with indentations at oppositely situated sides of the plug contact;

a second plug connector part including a plug socket contact having a plug receptacle and elastic locking hooks, the plug receptable being on a side of the second plug connector part; and the plug connector parts being connectable with the plug contact being received along an insertion direction into the plug receptacle when the plug connector parts are connected; and wherein the elastic locking hooks of the plug socket contact engage with the indentations of the plug contact when the plug connector parts are connected to thereby counteract disconnection of the plug connector parts; and the electrical plug connector assembly further comprising an unlocking means mounted on the second plug connector part for enabling the plug connector parts to be disconnected when the plug connector parts are connected;

the unlocking means including a button, the button being mounted on a side of the second plug connector part opposite along the insertion direction from the side of the second plug connector part on which is on the plug receptacle, the button being held in a rest position by a restoring force of a coil spring, and the button including extensions that run along the insertion direction and rest against inner sides of the elastic locking hooks, the inner sides of the elastic locking hooks being sides of the elastic locking hooks that face the oppositely situated sides of the plug contact when the plug contact is received by the plug receptacle; and the button being movable along the insertion direction from a rest position into an actuating position, against the restoring force of the coil spring, in which the extensions slide along the insertion direction between the inner sides of the elastic locking hooks and the oppositely situated sides of the plug contact, thereby lifting the elastic locking hooks out of the indentations to disengage the elastic locking hooks from the indentations.

2. The electrical plug connector assembly of claim 1 wherein:

the indentations of the plug contact are first and second indentations, the elastic locking hooks of the plug socket contact are first and second elastic locking hooks, and the extensions of the button of the unlocking means are first and second extensions.

3. The electrical plug connector assembly of claim 1 wherein:

the elastic locking hooks are stamped/bent parts of a spring sheet metal material.

4. The electrical plug connector assembly of claim 1 wherein:

the oppositely situated sides of the plug contact are narrow sides of the plug contact.

5. The electrical plug connector assembly of claim 1 wherein:

the plug contact is metallic.

6. The electrical plug connector assembly of claim 5 wherein:

the elastic locking hooks are metallic.

* * * * *